3,679,459
BEARING MEMBER FOR HIGH TEMPERATURE APPLICATIONS

Vemulapalli D. Rao, Woodhaven, Yeshwant P. Telang, Grosse Ile, and Jerry E. White, Dearborn Heights, Mich., assignors to Ford Motor Company, Dearborn, Mich.
No Drawing. Filed Apr. 7, 1971, Ser. No. 132,231
Int. Cl. B44d 1/16
U.S. Cl. 117—69
7 Claims

ABSTRACT OF THE DISCLOSURE

A seal member for rubbing against a rotating ceramic regenerator has a surface layer consisting essentially of calcium fluoride, zinc oxide and stannic oxide. The surface layer is supported on a metal substrate and a bonding layer of nickel aluminide can be applied between the substrate and the surface layer. The surface layer has surprisingly low friction and wear and excellent resistance to salt attack when operating at temperatures of about 900–1600° F.

BACKGROUND OF THE INVENTION

This invention relates to sealing members of the type disclosed in U.S. patent application Ser. No. 854,397 filed Sept. 2, 1969, and assigned to the assignee of this application.

Rotary regenerators for gas turbine engines are being made of a ceramic material capable of effective heat transfer at elevated temperatures. Typical ceramic materials useful in such regenerators include petalite, glass-ceramics, spodumene or other refractory materials having suitable high temperature properties. Cercor materials sold by Corning Glass Company are of this type. Ordinary metal seals are incapable of surviving at the operating temperature intended for such ceramic regenerators and extensive research has been conducted to develop seals having a low coefficient of friction, low wear properties, and good sealing performance when used with the regenerator materials. Seal members made of metal oxides or carbides are capable of withstanding the expected temperatures; in general, however, these materials result in relatively high wear of the ceramic core.

The aforementioned patent application is based on the discovery of several glaze producing materials and matrix materials that combine to produce bearing surfaces having good friction and wear properties at elevated temperatures. At high temperatures, a coating of calcium fluoride as the glaze producing material and nickel oxide as the matrix material produces good wear and friction characteristics, but the coating is susceptible to attack by the various salts applied to roadways to minimize dust or eliminate ice and snow. Such prior coatings thus are useful primarily in stationary engines that are remote from detrimental salts or in engines equipped with devices for removing the salts from the inducted air.

SUMMARY OF THE INVENTION

This invention provides a bearing member having low friction, low wear and extremely high resistance to salt attack at relatively high operating temperatures. The bearing member is particularly useful as a rubbing seal for a ceramic regenerator of a gas turbine engine but also can be used as a bearing or rubbing seal for other mechanisms operating in similar environments. The bearing member comprises a substrate having an attached surface layer that consists essentially of calcium fluoride, zinc oxide and stannic oxide.

Test results indicate that the calcium fluoride of the surface layer combines with at least some of the zinc oxide to form the glaze producing material. The exact composition of the glaze producing material and the matrix material and the mechanism by which the bearing member produces its highly desirable properties are not known, however.

An intermediate bonding layer such as nickel aluminide or nickel chromium can be applied between the surface layer and the substrate. Useful substrates include nickel-chromium stainless steels such as 316SS or nickel base alloys such as Incoloy 600, Incoloy 750, Hastalloy X, etc. The thermal expansion characteristics of the substrate preferably are matched to the surface layer. Where proper matching is not possible, the intermediate layer is selected to assist in absorbing the effects of the differences. Several intermediate layers can be used for this purpose if desired.

Bearing members of this invention generally are manufactured by plasma spraying powders of the desired layers onto a surface of the substrate that has been grit blasted to improve adhesion. The bonding layer is applied by mixing powders of the appropriate ingredients and spraying the powder onto the grit blasted surface of the substrate. Other intermediate layers then are applied as desired; an intermediate layer consisting essentially of lithium fluoride and calcium oxide or magnesium oxide is desired in many applications because it assists in absorbing thermal expansion differences and it protects the substrate or the bonding layer from any reactions involving the components of the surface layer.

Raw powders for the surface layer are dried and blended intimately. Powders having a relatively fine particle size such as −325 mesh are preferred but satisfactory results can be obtained with larger particle sizes. The blended powders are sintered in a neutral or slightly oxidizing atmosphere and the sintered product is crushed to obtain a particle size suitable for plasma spraying. Sintering preferably is carried out in a nonoxidizing atmosphere; if an oxidizing atmosphere is used, care must be exercised to avoid forming more than about 0.2 percent free calcium oxide.

In an alternative technique, the raw materials for the surface layer are wet blended with a binding agent such as carbowax, gum-arabic, or polyvinyl alcohol to obtain a water base slurry. The slurry is spray-dried to obtain a particle size suitable for plasma spraying. Argon or some other inert gas preferably is used as the carrier gas during plasma spraying of the materials used to form the surface layer.

Bearings having surface layers of this invention provide the best combination of friction, wear, and resistance to salt attack when operated at temperatures of about 900–1600° F. Operating loads preferably range up to about 15 p.s.i. against honeycomb surfaces such as those of a ceramic regenerator and up to 50 p.s.i. when rubbing against continuous members. Relative surface speeds preferably are maintained within 5–500 feet per minute against ceramics and 5–1000 feet per minute against metals.

Surface layers consisting essentially of 30–40 weight percent calcium fluoride, 43–53 weight percent zinc oxide, and 12–24 weight percent stannic oxide provide the best combination of friction, wear, and resistance to salt attack. Other impurities such as free calcium oxide, iron, sodium and potassium preferably are maintained below 0.1 weight percent to achieve maximum properties.

DETAILED DESCRIPTION

A substrate bar of Hastalloy X is cleaned thoroughly to remove oxide, scale, etc., and vapor degreased to remove any oily compounds. A surface of the substrate is grit blasted to roughen its texture to an rMs of about 125. A bonding layer of nickel aluminide about 0.004–0.006 inch is applied to the grit blasted surface. A barrier layer about 0.008–0.012 inch thick of 80 weight percent nickel oxide and 20 weight percent calcium fluoride is applied to the bonding layer.

Thirty-five weight parts of calcium fluoride powder, 47 weight parts of zinc oxide powder, and 18 weight parts of stannic oxide powder are dried at 250–300° F. for at least 1 hour to remove moisture. The powders have a particle size of —325 mesh. A Patterson-Kelly twin shell blender mixes the powders for at least 15 minutes and is followed by high speed blending in a Waring type blender to produce an intimate mixture thereof. The blended materials are sintered at 2400–2800° F. for at least 1 hour in a neutral atmosphere. Crushing and grinding the sintered mass reduces it to a particle size suitable for plasma spraying.

Plasma spraying is carried out with a Plasmadyne spray gun using 50–65 cubic feet per minute of argon carrier gas and 750–800 amperes. The gun is held about 4 inches from the substrate and spraying is continued until a layer 0.01–0.05 inch thick is applied to the surface of the barrier layer. For protective purposes, the material also is applied to the edges of the previous layers. Grinding produces a surface finish of about 40 rMs on the surface layer.

The bearing member is installed in a test rig in which a ceramic regenerator is loaded against the surface layer. During 200 hours of test operation at 1400° F. with a loading of 7 p.s.i., the bearing member displays a coefficient of friction of about 0.15–0.2 and a wear rate of about 0.0007 inch per 100 hours. Similar operation at a loading of 10 p.s.i. produces a friction coefficient of 0.08–0.15 and a wear rate of 0.0005 inch per 100 hours. At 1400° F. and 15 p.s.i., the friction coefficient is 0.2 and the wear rate is about 0.0006 inch per 100 hours.

To evaluate the resistance to salt attack, the surfaces of bearing and the regenerator are coated with an aqueous solution of 10 percent potassium chloride and 10 percent sodium chloride. After the solution dries, the bearing member is installed in the test rig and operated against the regenerator at 1400° F. and 7 p.s.i. The friction coefficient is 0.15 and the wear rate is 0.001 inch per 100 hours. After 200 hours of operation, the bearing member does not exhibit any detrimental effects from the salts of the solution.

For comparison purposes, a bearing member made in the manner described above except that its surface coating consists essentially of 80 weight percent nickel oxide and 20 weight percent calcium fluoride is tested in the test rig. At 1400° F. and loads ranging from 7 to 15 p.s.i., the test member exhibits friction coefficients ranging from 0.3–0.35 and wear rates ranging from 0.001–0.002 inch per 100 hours. The member failed catastrophically 10 hours after being coated with the potassium chloride-sodium chloride salt solution.

Thus this invention provides a high temperature bearing member having a highly desirable combination of properties. The bearing member is useful particularly as a rubbing seal for the ceramic regenerator of a gas turbine engine.

We claim:
1. A bearing member having a low coefficient of friction and low wear at high operating temperatures comprising a substrate having a surface layer attached to one surface, said surface layer consisting essentially of calcium fluoride, zinc oxide and stannic oxide.
2. The bearing member of claim 1 in which the substrate is a nickel base alloy.
3. The bearing member of claim 1 comprising an intermediate barrier layer between said substrate and said surface layer, said barrier layer consisting essentially of nickel oxide and calcium fluoride.
4. The bearing member of claim 1 in which the surface layer consists essentially of 30–40 weight percent calcium fluoride, 43–53 weight percent zinc oxide, and 12–24 weight percent stannic oxide.
5. The bearing member of claim 4 in which the surface layer consists essentially of about 35 weight percent calcium fluoride, about 47 weight percent zinc oxide and about 18 weight percent stannic oxide.
6. The bearing member of claim 5 in which the substrate is a nickel base alloy.
7. The bearing member of claim 6 comprising an intermediate barrier layer between said substrate and said surface layer, said barrier layer consisting essentially of nickel oxide and calcium fluoride.

References Cited
UNITED STATES PATENTS

| | | | |
|---|---|---|---|
| 3,189,512 | 6/1965 | Stong | 106—286 |
| 3,481,715 | 12/1969 | Whalen et al. | 117—69 |
| 3,508,955 | 4/1970 | Sliney | 117—127 |
| 3,573,962 | 4/1971 | Blampin | 117—93.1 PF |

ALFRED L. LEAVITT, Primary Examiner

C. K. WEIFFENBACH, Assistant Examiner

U.S. Cl. X.R.

106—286; 117—93.1 PF, 127, 169; 252—25